A. M. OLDS.
Lumber Measure.
No. 43,789. Patented Aug. 9, 1864.
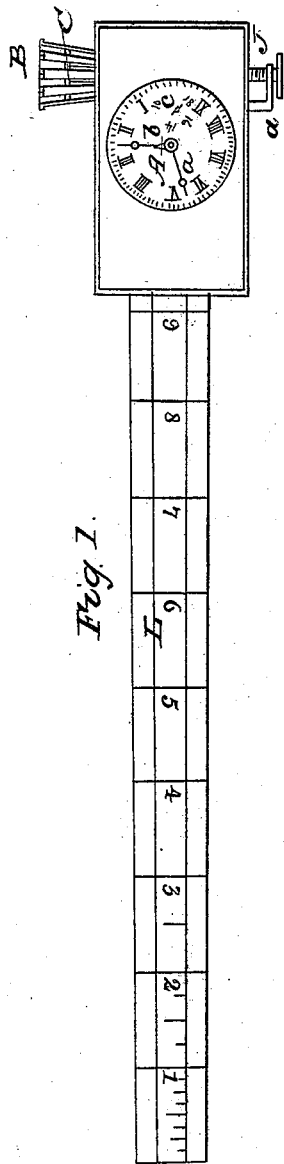
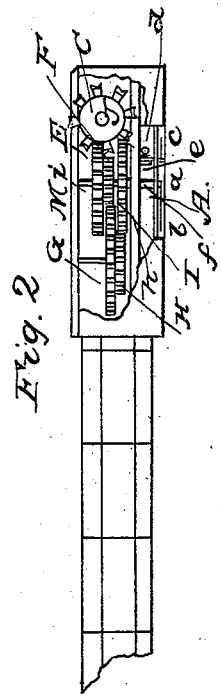
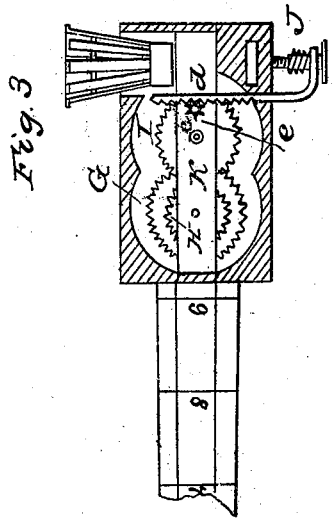
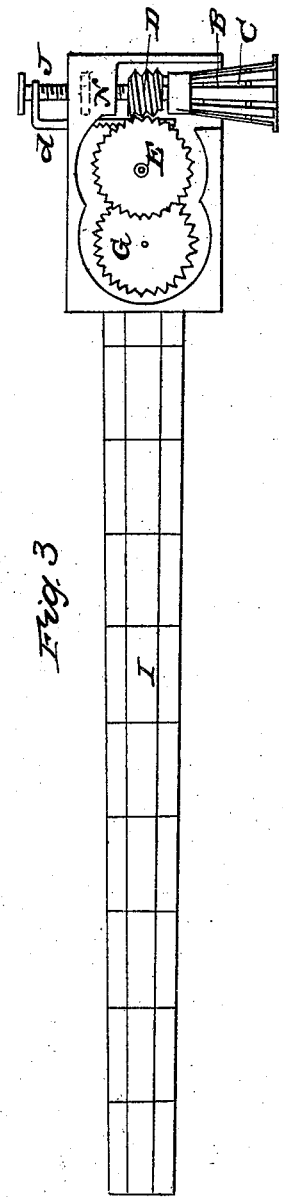

es.
UNITED STATES PATENT OFFICE.

A. M. OLDS, OF CHICAGO, ILLINOIS.

IMPROVEMENT IN LUMBER-MEASURERS.

Specification forming part of Letters Patent No. 43,789, dated August 9, 1864.

*To all whom it may concern:*

Be it known that I, A. M. OLDS, of Chicago, in the county of Cook and State of Illinois, have invented a new and useful Improved Self-Registering Lumber-Measurer; and I do hereby declare that the following is a full, clear, and exact description thereof, reference being had to the accompanying drawings and the letters and figures marked thereon, which form part of this specification.

In said drawings, Figure 1 represents a plan or top view of my invention; Fig. 2, a side view of the same, part of the casing being broken away to disclose the interior arrangements. Fig. 3 is a back view thereof with the casing M removed, and Fig. 4 is a top sectional view at the line $x$ in Fig. 2.

Similar letters of reference in the different figures denote corresponding parts of my invention.

The nature of my invention consists in a novel instrument or device for measuring lumber by simply running or moving the same across the board or boards, the instrument being susceptible of a simple and easy adjustment, so that whatever the length of the lumber may be, by simply moving it across the board or boards it will register infallibly upon a dial-plate, for that purpose attached, the exact number of feet, board-measure, in the lumber so measured.

To enable those skilled in the art to understand how to construct and make use of my invention, I will proceed to describe the same with particularity, reference being made to the aforesaid drawings.

A represents the dial-plate, which is divided into ten spaces, as shown, each of which spaces may be again subdivided as desired, the hand or pointer $a$ indicating the hundreds of feet in measurement, and the pointer $b$ indicating the tens of feet. The small pointer $c$, with the surrounding numbers, is to enable the instrument to be adjusted properly to adapt it to measuring lumber of different lengths, which is effected by turning the shaft J by means of the button upon the end of said shaft until the pointer $c$ points to the number indicating the length of the lumber to be measured.

B represents an expansion-wheel whose revolution across the board by means of intermediate devices moves the pointers $a$ and $b$ to the proper position upon the dial-plate to indicate the measurement. To this expansion-wheel B is rigidly connected the worm D, so that the revolution of B imparts the same motion to D, both revolving upon the shaft or axle J, which passes through the wheel or disk C, being provided with a shoulder on each side of said disk, so that while the shaft J rotates freely within the disk C a longitudinal movement of the shaft will force the disk outward toward the end of the expansion-wheel, or retract the same within it, thus by force of the elasticity of the steel bars composing the wheel B enlarging or diminishing the diameter of B, as the case may require. That part of the shaft J passing through the block N has a screw cut upon it, which fits in a female screw in N, so that a longitudinal motion can be given to J by rotating it as aforesaid. The toothed bar $d$ is provided with an arm exterior to the casing, which fits into the thread of the screw upon J, the teeth upon said rod $d$ gearing into the spur-wheel E, so that the bar $d$ partakes of the longitudinal movement imparted to J, and by revolving the spur-wheel $e$ moves the pointer $c$, so as to indicate the proper adjustment of the disk C within B for lumber of different lengths.

Having properly adjusted the machine for the required length, it is then moved across the board, the teeth upon the ends of the bars composing the expansion-wheel causing the same to rotate by the movement. The rotation of D revolves the spur-wheel E, which, together with the pinion F, is fixed upon the shaft or spindle $i$, to which spindle the pointer $b$ upon the dial-plate is attached. The revolution of F imparts motion to G, and H being attached to G, motion is thereby communicated to the wheel I, which revolves upon said shaft $i$. To this wheel I is attached the hollow spindle $f$, revolving with it, to which the pointer $a$ upon the dial-plate is attached.

The above described gearing is so arranged and proportioned that the wheel E, which carries the pointer $b$, revolves ten times while the wheel I, carrying the pointer $a$, makes a single revolution. As one revolution of the expansion-wheel moves the pointers $a$ $b$ the same distance, whatever the diameter thereof may be, it is evident that the shorter the board to be measured the more the wheel B must be expanded, so that it shall make less revolutions in traversing the width of the board, which is effected by forcing the disk C inward, thus causing the perimeter of B to expand and enlarge, thereby accomplishing the purpose and object desired.

K represents a block or bar extending longitudinally through the instrument, and serves to support the shafts of the wheel G and e.

L, the handle whereby the measurer is moved or drawn across the board, may be of any desired length; but I prefer one of such length as will make the whole instrument one foot in length, as a matter of convenience. This handle may also be subdivided into inches and parts of inches, as shown, if desired.

Having described the construction and operation of my invention, I will now specify what I claim as new and desire to secure by Letters Patent.

1. The expansible wheel B, provided with the adjustable disk C, or its equivalent, operating substantially as and for the purposes herein set forth and shown.

2. The combination of the disk C, the shaft J, and bent rod d, arranged and operating substantially as and for the purposes specified.

3. The combination of the expansible wheel B and the worm D with the system of wheels E F G H I, or their equivalent, substantially as and for the purposes herein delineated and set forth.

A. M. OLDS.

Witnesses:
W. E. MARRS,
L. L. COBURN.